US007306224B2

(12) United States Patent
Muñoz

(10) Patent No.: US 7,306,224 B2
(45) Date of Patent: Dec. 11, 2007

(54) SUPPORT FOR A DRIVE MOTOR OF IMAGE-BEARING ROLLERS IN AMUSEMENT MACHINES

(75) Inventor: Jesús Franco Muñoz, Madrid (ES)

(73) Assignee: Proindumar, S.L., Madrid (ES)

(*) Notice: Subject to any disclaimer, the term of this patent is extended or adjusted under 35 U.S.C. 154(b) by 585 days.

(21) Appl. No.: 10/882,161

(22) Filed: Jul. 2, 2004

(65) Prior Publication Data

US 2005/0023750 A1 Feb. 3, 2005

(30) Foreign Application Priority Data

Jul. 30, 2003 (ES) ............................ 200301829 U

(51) Int. Cl.
*A63F 13/00* (2006.01)
*A63F 9/24* (2006.01)
*G06F 17/00* (2006.01)
*G06F 19/00* (2006.01)

(52) U.S. Cl. .................. 273/142 R; 361/683; 361/685; 361/752; 273/143 R; 439/573

(58) Field of Classification Search .......... 439/11-185, 439/258, 266, 310, 883, 928; 463/1-47; 273/142; 361/600
See application file for complete search history.

(56) References Cited

U.S. PATENT DOCUMENTS 5,993,252 A * 11/1999 Laurx ......................... 439/573
6,067,225 A * 5/2000 Reznikov et al. ........... 361/685
6,101,087 A * 8/2000 Sutton et al. ............... 361/686
6,102,396 A * 8/2000 Liu ........................ 273/143 R
2004/0257777 A1* 12/2004 Barsun et al. ............. 361/752
2005/0152106 A1* 7/2005 Coster et al. ............... 361/683

FOREIGN PATENT DOCUMENTS

WO WO 9948067 A1 * 9/1999

* cited by examiner

*Primary Examiner*—John M. Hotaling, II
*Assistant Examiner*—Paul A. D'Agostino
(74) *Attorney, Agent, or Firm*—Kramer & Amado, P.C.

(57) ABSTRACT

The support for a drive motor of image-bearing rollers in amusement machines constitutes an assembly allowing for its removal with regard to a general support (8) fixed to the machine, constituted of a base (1) on which the motor (2) is fixed, which has lugs (7) projecting from the base which are coupled in necks (9) arranged for that purpose on the general support, in combination with a laminar portion (12) of said base which is housed in a groove (11) arranged in the general support, said base locking to the general support by means of a tilting side arm (13) hinged to the general support, which establishes an electric contact by means of a pin connecter (4) arranged on the respective side of the base of the motor for the feed thereof, the base having in the upper part a removable handle (5) coupled by locking on said base for its gripping and removal.

3 Claims, 2 Drawing Sheets

SUPPORT FOR A DRIVE MOTOR OF IMAGE-BEARING ROLLERS IN AMUSEMENT MACHINES

OBJECT OF THE INVENTION

The present invention refers to a support for a drive motor of image-bearing rollers used in amusement machines, of the type granting cash prizes and in which the images are arranged on a continuous band arranged on each one of several rollers which this type of machines has.

The object of the invention is to provide a support for the drive motor of the respective roller, in which the support is materialized by several parts fitted together, with the capacity for being disassociated and allowing for the removal of the motor assembled on a base forming part of the assembly of the support.

BACKGROUND OF THE INVENTION

As is known, the amusement machines granting cash prizes usually have three or four rotating drums or rollers, on the peripheral surface of which there is a continuous band bearing a plurality of images which, depending on the position they occupy at the end of each game, will grant a certain prize or not, allowing the images to be seen though the image displays arranged for that purpose on the front of the amusement machine itself.

However, each one of the rotating rollers or drums incorporated in this type of machines is usually operated in terms of its rotating by a stepper motor in order to be able to control the movement of the roller, and so that each roller shows the expected figure at the end of the game.

Said motors adopt different positions, according to the type of the machine, manufacturer, etc., although there is an embodiment in which the motor is arranged inside the respective rotating drum or roller.

However, until now, the form of supporting the motor, when the latter is located inside the drum or roller, is complex, and in order to assemble and disassemble the motor it is necessary to carry out multiple operations.

DESCRIPTION OF THE INVENTION

The proposed support has been conceived precisely for solving the drawbacks previously set forth, i.e. for being able to arrange the drive motor of an image-bearing roller in amusement machines, in a simple manner, with complete safety and with easy assembly and disassembly.

More specifically, the support of the invention is based on the fact that the motor itself is fixed on a base susceptible to being removably connected with a part acting as a handle, and which base is in turn removably coupled on a base acting as a general support, a base including a tilting side arm which, in one position, allows for the disconnection of the base of the motor with regard to the general support, and therefore, the removal of said base with the motor by gripping the handle provided in the upper part, whereas in another position of the arm, the latter causes the locking of the base of the motor on the general support, preventing the disconnection thereof, moreover said arm establishes in that locked position the connection with a pin connecter arranged for that purpose on the respective side of the base of the motor.

In this manner and the general support being assembled on the structure corresponding to the machine, at the time when so desired, either because of necessities, because of breakdown or because of any other circumstance, the motor can be removed by simply unlocking the arm and freeing the base of said motor, removing the latter by simply pulling on the handle coupled in the upper part, maintaining the general support fixed to the structure of the machine.

DESCRIPTION OF THE DRAWINGS

To complement the description being made and for the purpose of helping to better understand the features of the invention according to a preferred practical embodiment example thereof, a set of drawings is attached as an integral part of said description, wherein the following has been shown in an illustrative and non-limiting manner.

PREFERRED EMBODIMENT OF THE INVENTION

Figure 1:
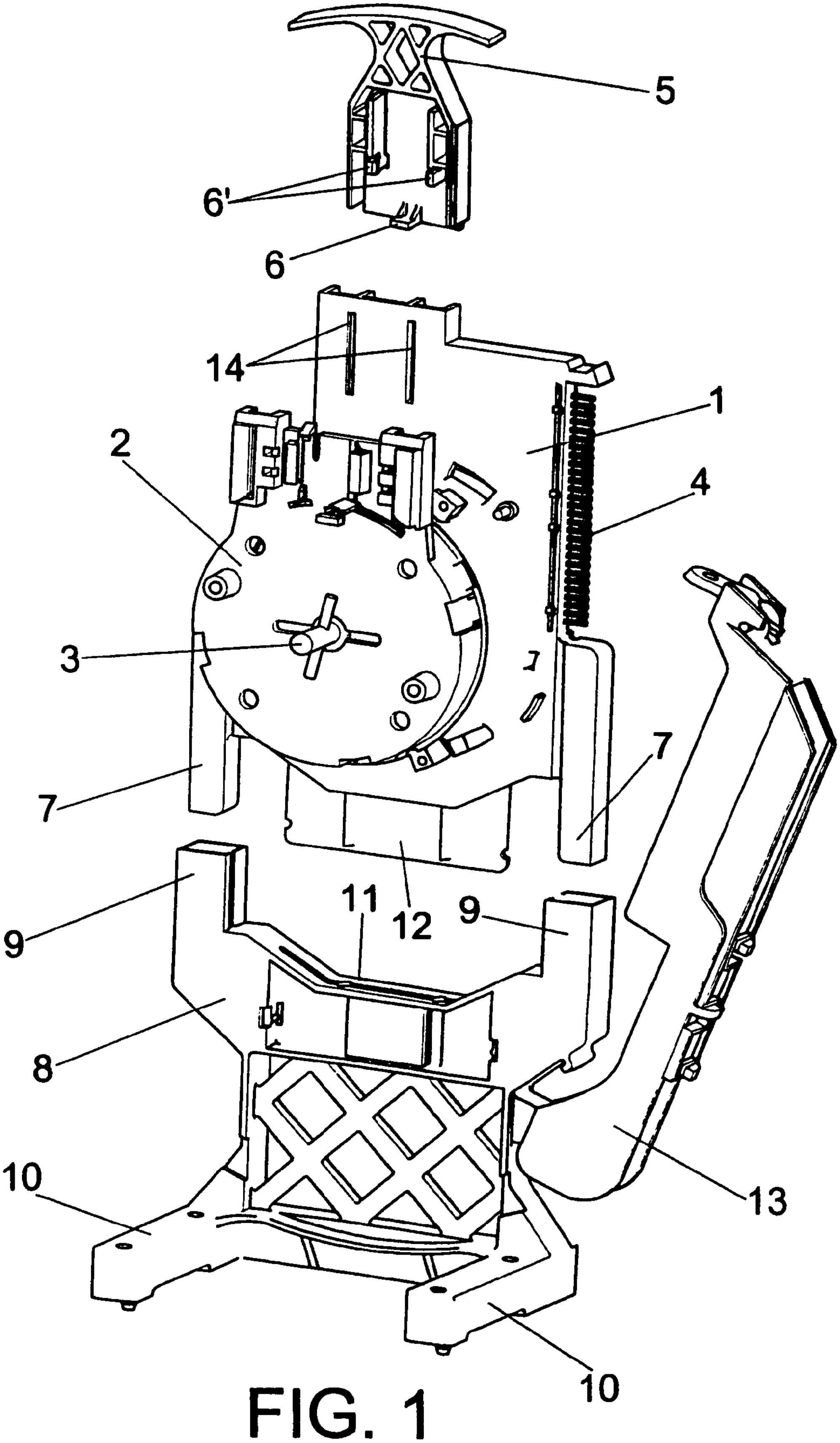
FIG. 1 shows an exploded perspective view of the assembly of parts or elements constituting the support for the drive motor of an image-bearing roller which amusement machines have for that purpose.
Figure 2:
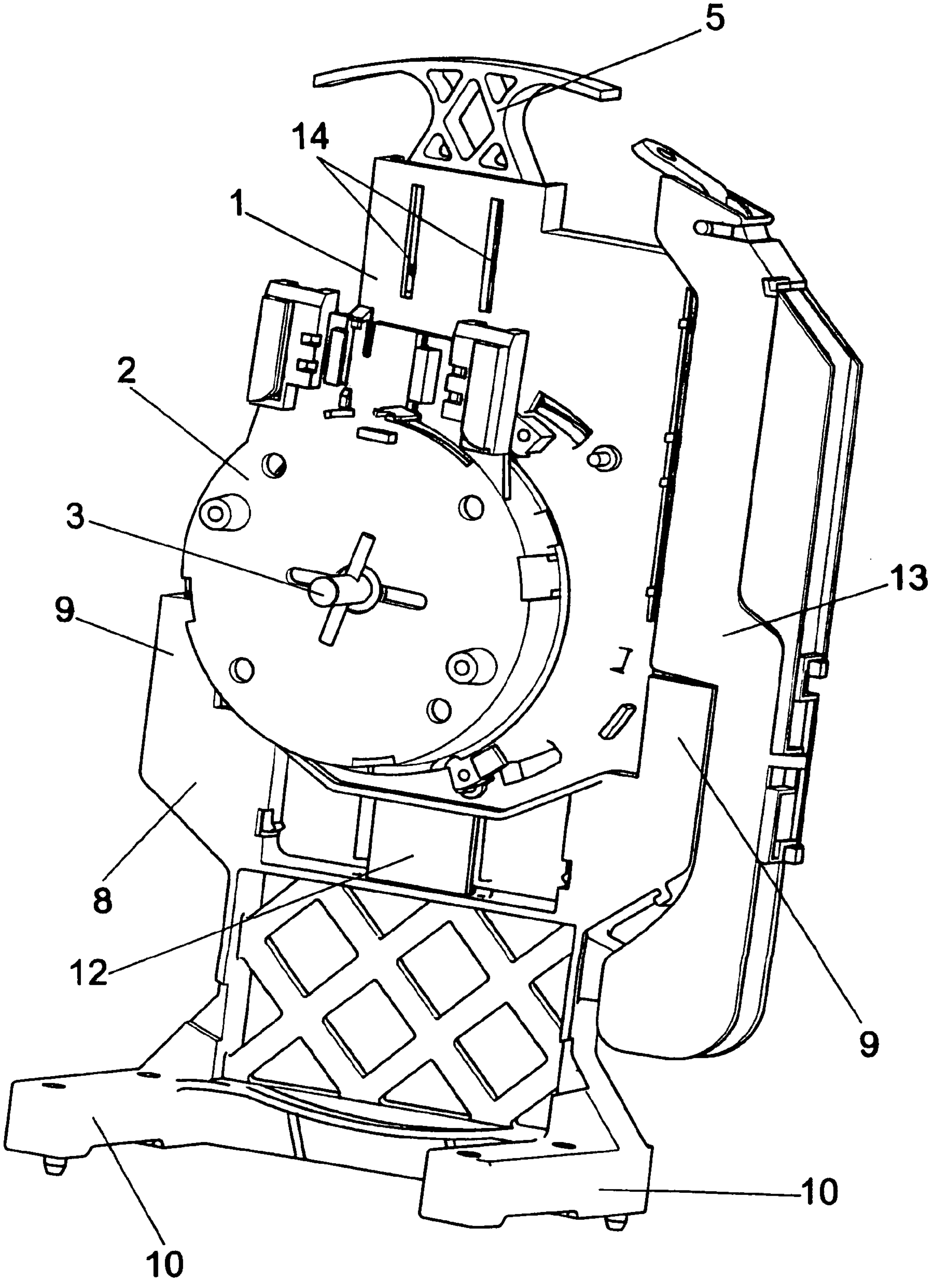
FIG. 2 shows another perspective view, in this case with all the elements or parts duly coupled to one another and the arm in the locked position.

In view of the described figures, it can be observed how the support of the invention includes a base (1) on which a motor (2) is suitably fixed, the shaft (3) of which is connected to the corresponding image-bearing roller or drum for carrying out the rotation of the latter.

The base (1) has a pin connecter (4) on one of its sides, whereas on the upper part thereof, a part (5) is coupled which acts as a handle coupled on the rear part of said base (1), being retained in the latter by means of a flange (6) which said part or handle (5) has for that purpose, a flange (6) which locks in a complementary projection established for that purpose in the rear part of said base (1) where the corresponding motor is fixed. Said locking is complemented with the coupling of projections (6') of the handle (5) in windows (14) established for that purpose in the base (1).

The assembly formed by the base (1) with the motor (2) can be coupled, through the side lugs (7) of the base, in a general support (8), specifically in necks (9) provided for that purpose in this general support (8), which will constitute the fixing means to the structure of the machine, which has legs with openings (10) for carrying out this fixing of the general support (8) of the structure, all this such that this general support (8) has a groove (11) in which a plate (12), which the base (1) of the motor (2) has for that purpose, is coupled.

The coupling between the base (1) and the general support (8) can be kept locked by means of a side arm (13) hinged by the lower end thereof on one side of the general support (8), whereas on the side of said arm opposite to the corresponding side, it has means which establish the connection of the side corresponding to the base (1) to the motor (2) with the pin connecter (4).

FIG. 1 shows how the arm (13) is collapsed outwards, allowing for the unlocking between the base (1) and the general support (8), and, therefore, the removal of said base with the motor (2), by simply pulling on the handle (5), whereas when the coupling of the lugs (7) of the base (1) on the necks (9) of the general support (8) is carried out, the locking produces a tilting of said side arm (13) in the opposite direction, which arm, in the closed or locked position, carries out the electric contact with the pin connecter (4), as has been previously stated.

The invention claimed is:

1. A support for a drive motor of image-bearing rollers in amusement machines, in which the motor (2) is arranged inside the corresponding image-bearing roller, a shaft (3) of the motor being coupled to the roller for the rotation of said shaft during the operation of the motor, characterized in that said support is constituted of a base (1) on which the motor is fixed, said base having coupling means for coupling said base to a general support (8) fixed to the structure of the machine, said base with the motor being locked to the general support by means of a tilting side arm (13) hinged to the general support, said arm which in turn establishes, in said locked position, electric contact with a pin connecter (4) arranged for that purpose on a respective side of the base of the motor, gripping means for gripping said base having been provided so that the said base, and therewith the motor, can be removed with regard to the machine.

2. A support for the drive motor of image-bearing rollers in amusement machines according to claim 1, characterized in that said coupling means for coupling between said base (1) of the motor and said general support (8) are constituted of lugs (7) projecting from said base which are coupled in necks (9) arranged for that purpose on said general support, in combination with a laminar portion (12) of said base of the motor which is housed in a groove (11) arranged for that purpose in an upper part of the general support, said general support having anchor legs (10) for the fixing to the corresponding structure of the machine.

3. A support for the drive motor of image-bearing rollers in amusement machines according to claim 1, characterized in that said gripping means for gripping said base (1) are constituted of a removable handle (5) coupled by locking on said base (1) of the motor (2).

* * * * *